(12) United States Patent
Mazgut et al.

(10) Patent No.: US 12,375,003 B2
(45) Date of Patent: Jul. 29, 2025

(54) SYNCHRONOUS RECTIFICATION CONTROL IN LLC TOPOLOGY

(71) Applicant: SEMICONDUCTOR COMPONENTS INDUSTRIES, LLC, Phoenix, AZ (US)

(72) Inventors: Roman Mazgut, Zilina (SK); Tomas Tichy, Roznov pod Radhostem (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 262 days.

(21) Appl. No.: 17/822,852

(22) Filed: Aug. 29, 2022

(65) Prior Publication Data
US 2023/0318473 A1 Oct. 5, 2023

Related U.S. Application Data

(60) Provisional application No. 63/362,172, filed on Mar. 30, 2022.

(51) Int. Cl.
*H02M 3/335* (2006.01)
*H02M 1/08* (2006.01)
*H02M 3/00* (2006.01)

(52) U.S. Cl.
CPC ......... *H02M 3/33592* (2013.01); *H02M 1/08* (2013.01); *H02M 3/01* (2021.05)

(58) Field of Classification Search
CPC .......... H02M 3/00; H02M 3/01; H02M 3/015; H02M 3/22; H02M 3/24; H02M 3/315;
(Continued)

(56) References Cited

U.S. PATENT DOCUMENTS 9,166,490 B2 * 10/2015 Yu .......................... H05B 45/14
9,350,258 B2 * 5/2016 Choi .................. H02M 3/33592
(Continued)

OTHER PUBLICATIONS

Onsemi, "Product Data Sheet—Advanced Secondary Side LLC Resonant Converter with Synchronous Rectifier Control NCP4390," Rev 2—Nov. 2021.
(Continued)

*Primary Examiner* — Thienvu V Tran
*Assistant Examiner* — Carlos O Rivera-Perez
(74) *Attorney, Agent, or Firm* — Dickinson Wright PLLC; Jonathan A. Schnayer

(57) ABSTRACT

Systems for power conversion, and controllers and methods for operating a power converter. The method includes receiving high-side and low-side primary signals that drive primary transistors of a power converter. The method also includes receiving a combined drain voltage signal for high-side and low-side synchronous rectifier (SR) transistors of the power converter. The method further includes generating a high-side SR signal based on the low-side primary signal and generating a low-side SR signal based on the high-side primary signal. The method also includes determining high-side and low-side body diode conduction times based on the combined drain voltage signal. The method further includes adjusting the high-side SR signal based on the high-side body diode conduction time and adjusting the low-side SR signal based on the low-side body diode conduction time.

20 Claims, 13 Drawing Sheets

(58) Field of Classification Search
CPC .... H02M 3/3155; H02M 3/325; H02M 3/335; H02M 3/33507; H02M 3/33515; H02M 3/33523; H02M 3/3353; H02M 3/33538; H02M 3/33546; H02M 3/33553; H02M 3/33569; H02M 3/33571; H02M 3/33573; H02M 3/33576; H02M 3/33584; H02M 3/33592; H02M 1/0003; H02M 1/0025; H02M 1/0038; H02M 1/0048; H02M 1/0051; H02M 1/0054; H02M 1/0058; H02M 1/08; H02M 1/083; H02M 7/02; H02M 7/04; H02M 7/043; H02M 7/12; H02M 7/155; H02M 7/162; H02M 7/1623; H02M 7/1626; H02M 7/21; H02M 7/217; H02M 7/219
USPC ................. 363/15–21.18, 44–48, 89, 95–99, 363/123–127; 323/271–275, 280, 323/282–285, 351
See application file for complete search history.

(56) References Cited

U.S. PATENT DOCUMENTS

| | | | |
|---|---|---|---|
| 10,819,245 B1* | 10/2020 | Iorio | H02M 1/088 |
| 11,159,090 B2* | 10/2021 | Mohammadi | H02M 1/083 |
| 2020/0403520 A1* | 12/2020 | Kikuchi | H02M 3/33592 |

OTHER PUBLICATIONS

MPS, "Product Data Sheet—MP6922 Dual Fast Turn-off Intelligent Controller," Rev 1.26—Apr. 30, 2018.
ST, "Product Data Sheet—SRK2001 Adaptive Synchronous Rectification Controller for LLC Resonant Converter," Rev 6—Sep. 2021.
Infineon, "Product Data Sheet—ICE2HS01G High Performance Resonant Mode Controller," Ver 2.1—May 24, 2011.

* cited by examiner

SYNCHRONOUS RECTIFICATION CONTROL IN LLC TOPOLOGY

CROSS-REFERENCE TO RELATED APPLICATIONS

This application claims priority to and the benefit of U.S. Provisional Application Ser. No. 63/362,172, filed Mar. 30, 2022, titled "METHOD OF SYNCHRONOUS RECTIFICATION CONTROL IN LLC TOPOLOGY," the entire disclosure of which is hereby incorporated by reference for all purposes.

BACKGROUND

Resonant converters are widely used to generate, among other things, DC output voltages. In an LLC topology, active switches can be used instead of Schottky diodes to increase conversion efficiency, especially when low output voltages are generated. Further, even in applications where galvanic isolation is needed, synchronous rectification can be used to increase conversion efficiency as well.

In power supplies with synchronous rectification, a negative current may develop in the circuit. Negative current can increase the voltages across switches in such a way that they may be damaged. Further, cross-conduction can cause damage. Care must be taken when controlling secondary-side synchronous rectifiers to provide efficient operation while protecting against conditions that can cause unwanted operation and can even cause damage to the electronics.

SUMMARY

Precise control of synchronous rectification can be achieved using high-precision sensors. However, use of high-precision sensors imposes hefty design restrictions. For example, high-precision sensors can require precise internal components, numerous high-voltage inputs, and are sensitive to printed circuit board (PCB) layout. The present disclosure provides methods, systems, and apparatuses that, among other things, regulate synchronous rectification for power converters based on the body diode conduction length at the end of the conduction phase.

The present disclosure provides a method for operating a power converter. The method includes receiving a high-side primary signal that drives a high-side primary transistor of a first stage of the power converter. The method also includes receiving a low-side primary signal that drives a low-side primary transistor of the first stage. The method further includes receiving a combined drain voltage signal for a high-side synchronous rectifier (SR) transistor and a low-side SR transistor of a second stage of the power converter. The method also includes generating, based on the low-side primary signal, a high-side SR signal that drives the high-side SR transistor. The method further includes determining a high-side body diode conduction time of a high-side body diode of the second stage based on the combined drain voltage signal. The method also includes generating, based on the high-side primary signal, a low-side SR signal that drives the low-side SR transistor. The method further includes determining a low-side body diode conduction time of a low-side body diode of the second stage based on the combined drain voltage signal. The method also includes adjusting the high-side SR signal based on the high-side body diode conduction time. The method further includes adjusting the low-side SR signal based on the low-side body diode conduction time.

The present disclosure also provides a system for power conversion. The system includes, in one implementation, a power converter and a controller. The power converter includes a first stage and a second stage. The first stage includes a high-side primary transistor driven by a high-side primary signal and a low-side primary transistor driven by a low-side primary signal. The second stage includes a high-side synchronous rectifier (SR) transistor, a high-side body diode, a low-side SR transistor, and a low-side body diode. The controller is configured to generate, based on the low-side primary signal, a high-side SR signal drives the high-side SR transistor. The controller is also configured to determine a high-side body diode conduction time of the high-side body diode based on a combined drain voltage signal for the high-side SR transistor and the low-side SR transistor. The controller is further configured to generate, based on the high-side primary signal, a low-side SR signal that drives the low-side SR transistor. The controller is also configured to determine a low-side body diode conduction time of the low-side body diode based on the combined drain voltage signal. The controller is further configured to adjust the high-side SR signal based on the high-side body diode conduction time. The controller is also configured to adjust the low-side SR signal based on the low-side body diode conduction time.

The present disclosure further provides a controller for a power converter. The controller includes, in one implementation, a first reference terminal, a second reference terminal, a comparator, and a synchronous rectifier (SR) controller. The first reference terminal is configured to receive a high-side primary signal that drives a high-side primary transistor of a first stage of a power converter. The second reference terminal is configured to receive a low-side primary signal that drives a low-side primary transistor of the first stage. The comparator is configured to generate a combined drain voltage signal for a high-side SR transistor and a low-side SR transistor of a second stage of the power converter. The SR controller is configured to generate, based on the low-side primary signal, a high-side SR signal that drives the high-side SR transistor. The SR controller is also configured to determine a high-side body diode conduction time of a high-side body diode of the second stage based on the combined drain voltage signal. The SR controller is further configured to generate, based on the high-side primary signal, a low-side SR signal that drives the low-side SR transistor. The SR controller is also configured to determine a low-side body diode conduction time of a low-side body diode of the second stage based on the combined drain voltage signal. The SR controller is further configured to adjust the high-side SR signal based on the high-side body diode conduction time. The SR controller is also configured to adjust the low-side SR signal based on the low-side body diode conduction time.

BRIEF DESCRIPTION OF THE DRAWINGS

For a detailed description of example implementations, reference will now be made to the accompanying drawings in which.

DEFINITIONS

Figure 1:
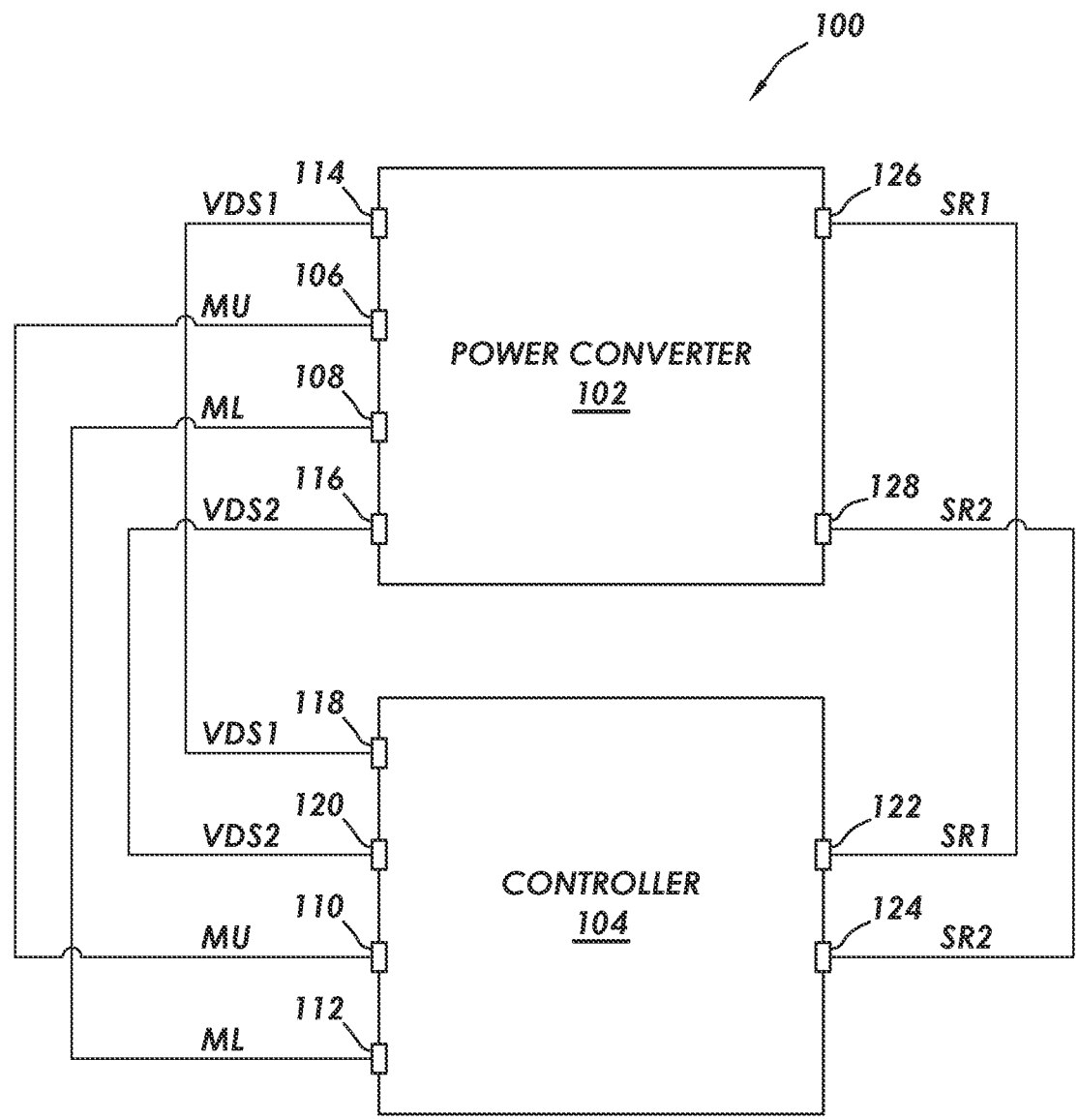
FIG. 1 is a block diagram of an example of a system for power conversion in accordance with some implementations.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

The terms "input" and "output" when used as nouns refer to connections (e.g., electrical, software), and shall not be read as verbs requiring action. For example, a timer circuit may define a clock output. The example timer circuit may create or drive a clock signal on the clock output. In systems implemented directly in hardware (e.g., on a semiconductor substrate), these "inputs" and "outputs" define electrical connections. In systems implemented in software, these "inputs" and "outputs" define parameters read by or written by, respectively, the instructions implementing the function.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), a microcontroller with controlling software, a reduced-instruction-set computer (RISC), a digital signal processor (DSP), a processor with controlling software, a programmable logic device (PLD), a field programmable gate array (FPGA), or a programmable system-on-a-chip (PSOC) configured to read inputs and drive outputs responsive to the inputs.

DETAILED DESCRIPTION

The following discussion is directed to various implementations of the invention. Although one or more of these implementations may be preferred, the implementations disclosed should not be interpreted, or otherwise used, as limiting the scope of the present disclosure, including the claims. In addition, one skilled in the art will understand that the following description has broad application, and the discussion of any implementation is meant only to be exemplary of that implementation, and not intended to intimate that the scope of the present disclosure, including the claims, is limited to that implementation.

Various examples are directed to power converters with synchronous rectification (SR) control. More particularly, various examples are directed to power converters and related controllers that regulate the SR based on the body diode conduction length at the end of the conduction phase. The specification now turns to an example system to orient the reader.

FIG. 1 is a block diagram of an example of a system 100 for power conversion in accordance with some implementations. The system 100 illustrated in FIG. 1 includes a power converter 102 and a controller 104. The system 100 illustrated in FIG. 1 is provided as one example of such a system. The methods described herein may be used with systems having fewer, additional, or different components in different configurations than the system 100 illustrated in FIG. 1. In some implementations, the power converter 102 and the controller 104 are separate components (as illustrated in FIG. 1). In alternate implementations, the power converter 102 and the controller 104 may be part of the same component. For example, the power converter 102 and the controller 104 may both be positioned on a single printed circuit board and/or within a single chip housing.

The power converter 102 illustrated in FIG. 1 includes control terminals 106 and 108 to receive a pair of complementary signals (e.g., primary signals MU and ML) that drive the power converter 102 as will be explained in more detail below in reference to FIG. 2. The controller 104 illustrated in FIG. 1 includes reference terminals 110 and 112 to receive the pair of complementary signals that drive the power converter 102. For example, the power converter 102 and the controller 104 may receive the pair of complementary driving signals from a separate controller (not shown). In alternate implementations, the controller 104 may be configured to generate and provide the pair of complementary driving signals to the power converter 102. The power converter 102 also includes reference terminals 114 and 116 which provide voltage drain signals VDS1 and VDS2 to reference terminals 118 and 120 of the controller 104. The controller 104 also includes control terminals 122 and 124 to provide synchronous rectifier signals (e.g., SR signals SR1 and SR2) to control terminals 126 and 128 of the power converter 102.

Figure 2:
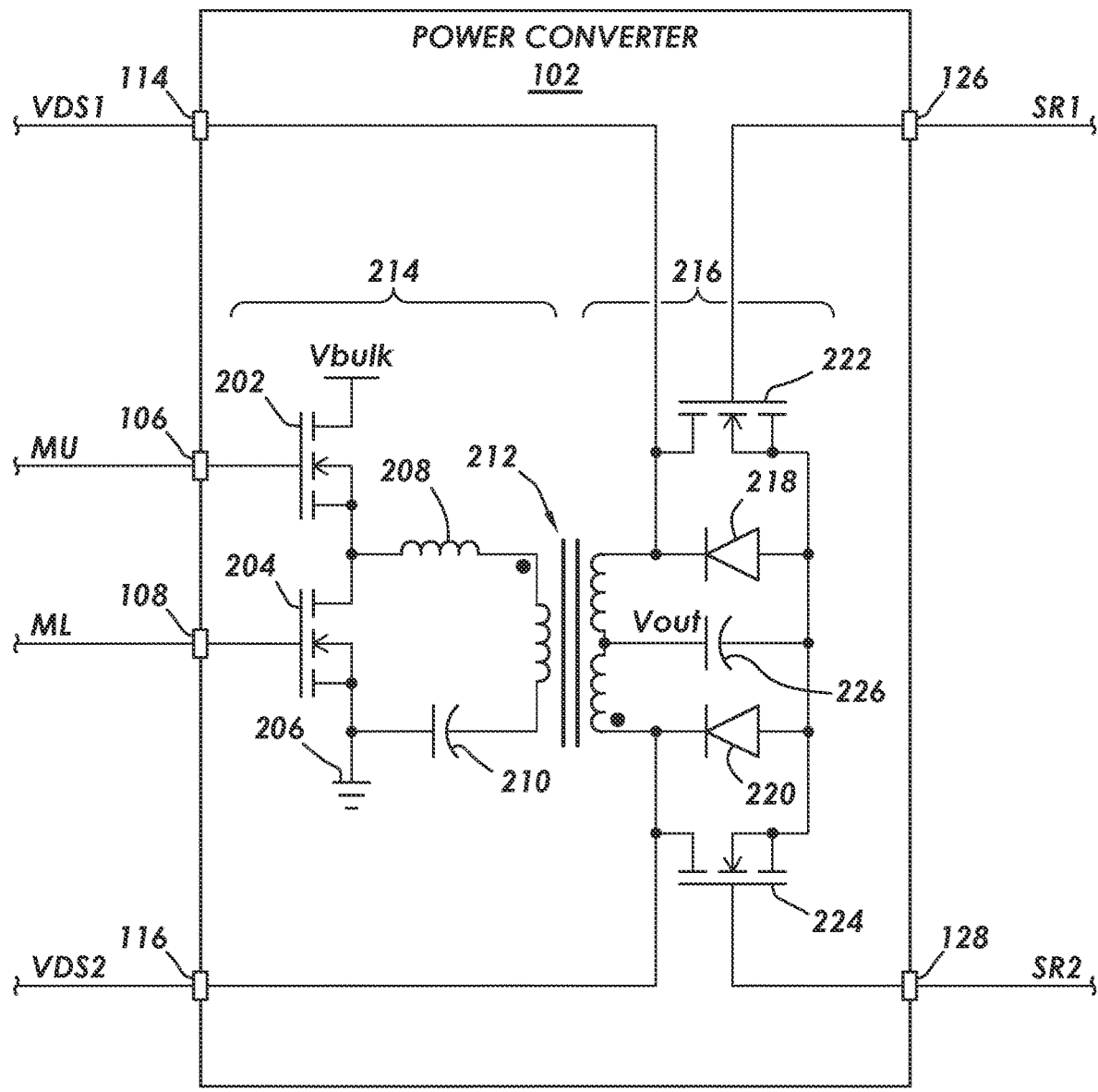
FIG. 2 is a partial schematic and a partial block diagram of an example of an power converter included in the system of FIG. 1 in accordance with some implementations.

FIG. 2 is a partial schematic and a partial block diagram of an example of the power converter 102 in accordance with some implementations. The power converter 102 illustrated in FIG. 2 includes a pair of primary transistors 202 and 204 that are coupled in a series configuration between input voltage Vbulk and ground terminal 206. The pair of primary transistors 202 and 202 are illustrated in FIG. 2 as metal-oxide-semiconductor field-effect transistors (MOSFETs), and in particular, N-channel MOSFETs. However, other types of FETs may be used (e.g., P-channel MOSFETs), and in fact other types of transistors may also be used (e.g., bi-polar junction transistors (BJTs) and Gallium nitride (GaN) transistors). The gate terminal of primary transistor 202 (an example of a "high-side primary transistor") is coupled to control terminal 106 to receive primary signal MU (an example of a "high-side primary signal"). The gate terminal of primary transistor 204 (an example of a "low-side primary transistor") is coupled to control terminal 108 to receive primary signal ML (an example of a "low-side primary signal"). The pair of primary signals drive the pair of primary transistors 202 and 204 to generate a square wave input. The power converter 102 illustrated in FIG. 2 also includes an inductor 208 and a capacitor 210 that together form a resonant tank to filter the square wave input and generate a sinusoidal input current. The sinusoidal input current is applied to the primary side 214 of transformer 212, which produces a sinusoidal output current. The sinusoidal output current is galvanically isolated from the resonant tank by transformer 212. The resonant tank is positioned on the primary side 214 of transformer 212. On the secondary side 216 of transformer 212 is a pair of body diodes 218 and 220 and a pair of SR transistors 222 and 224 which rectify the sinusoidal load current to generate a direct current (DC) signal (e.g., Vout). The secondary side 216 of transformer 212 also includes a capacitor 226. In FIG. 2, SR transistor 222 (an example of a "high-side SR transistor") is coupled across body diode 218 (an example of a "high side-body diode"). In some implementations, body diode 218 is an inherent component of SR transistor 222. SR transistor 222 is driven by SR signal SR1 (an example of a "high-side SR signal"). The gate terminal of SR transistor 222 is coupled to control terminal 126 to receive SR signal SR1. The drain terminal of SR transistor 222 is coupled to reference terminal 114 to provide drain voltage signal VDS1 to the controller 104. In FIG. 2, SR transistor 224 (an example of a "low-side SR transistor") is coupled across body diode 220 (an example of a "low side-body diode"). In some implementations, body diode 220 is an inherent component of SR transistor 224. SR transistor 224 is driven by SR signal SR2 (an example of a "low-side SR signal"). The gate terminal of SR transistor 224 is coupled to control terminal 128 to receive SR signal SR2. The drain terminal of SR transistor 224 is coupled to reference terminal 116 to provide drain voltage signal VDS2 to the controller 104.

Figure 3:
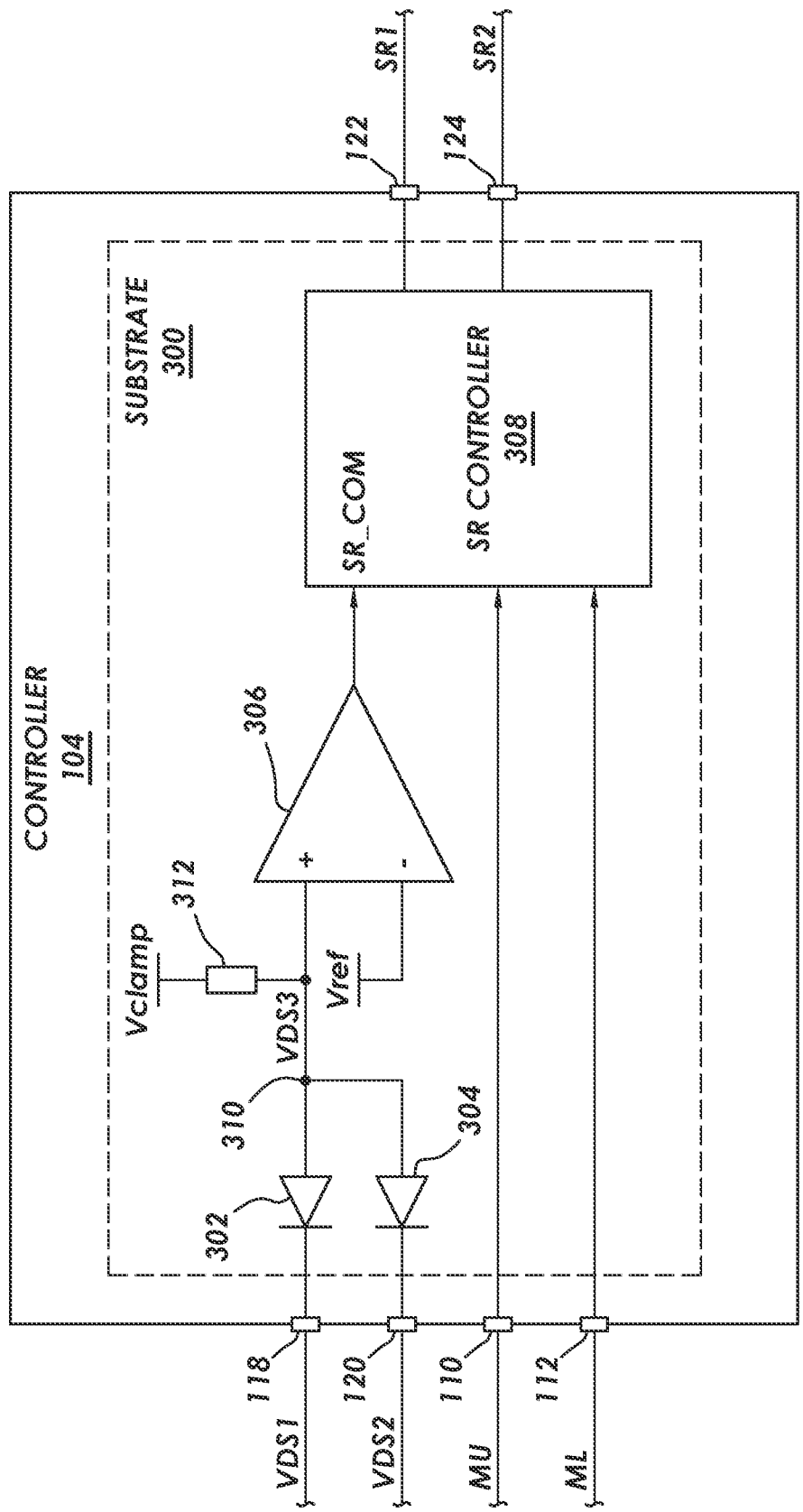
FIG. 3 is a partial schematic and a partial block diagram of an example of a controller included in the system of FIG. 1 in accordance with some implementations.

FIG. 3 is a block diagram of an example of the controller 104 in accordance with some implementations. In particular, the controller 104 may comprise electrical devices and circuits monolithically created on a substrate 300 and encapsulated within packaging; however, the functionality of the various components may be embodied on multiple substrates that are co-packaged (e.g., multi-chip module) and electrically coupled to each other and coupled to the various terminals. The controller 104 illustrated in FIG. 3 includes reference terminals 110, 112, 118, and 120 and control terminals 122 and 124. The example terminals are electrical connections exposed and accessible through the packaging. Additional terminals will be present (e.g., power terminal, reference voltage terminal, ground terminal), but those additional terminals are not shown so as not to unduly complicate the figure.

The controller 104 illustrated in FIG. 3 also includes a pair of diodes 302 and 304, a comparator 306, and an SR controller 308. Reference terminals 118 and 120 are coupled to a node 310 via the pair of diodes 302 and 304. In this manner, the drain voltage signals VDS1 and VDS2 are OR'd together to generate a combined drain voltage signal VDS3. In some implementations, the drain voltage signals VDS1 and VDS2 may be combined together outside of the controller 104 such that the controller 104 only includes one sensing pin for the combined drain voltage signal VDS3.

Node 310 is coupled to the non-inverting input of comparator 306 to provide the combined drain voltage signal VDS3 thereto. The non-inverting input of comparator 306 is also coupled to a pull-up current source 312 to pull node 310 high when reference terminals 118 and 120 are at high potential. The inverting input of comparator 306 is coupled to a reference voltage Vref. Comparator 306 outputs a comparison signal SR_COM that is logic high when the combined drain voltage signal VDS3 is greater than or equal to the reference voltage Vref, and is logic low when the combined drain voltage signal VDS3 is less than the reference voltage Vref. The output of comparator 306 is coupled to the SR controller 308 to provide the comparison signal SR_COM thereto. Reference terminals 110 and 112 are also coupled to the SR controller 308 to provide the primary signals MU and ML thereto. As will be described in more detail below, SR controller 308 uses the comparison signal SR_COM to control synchronous rectification. Given the binary nature of the comparison signal SR_COM, SR controller 308 can use the comparison signal SR_COM without high-precision analog sensing.

Figure 4:
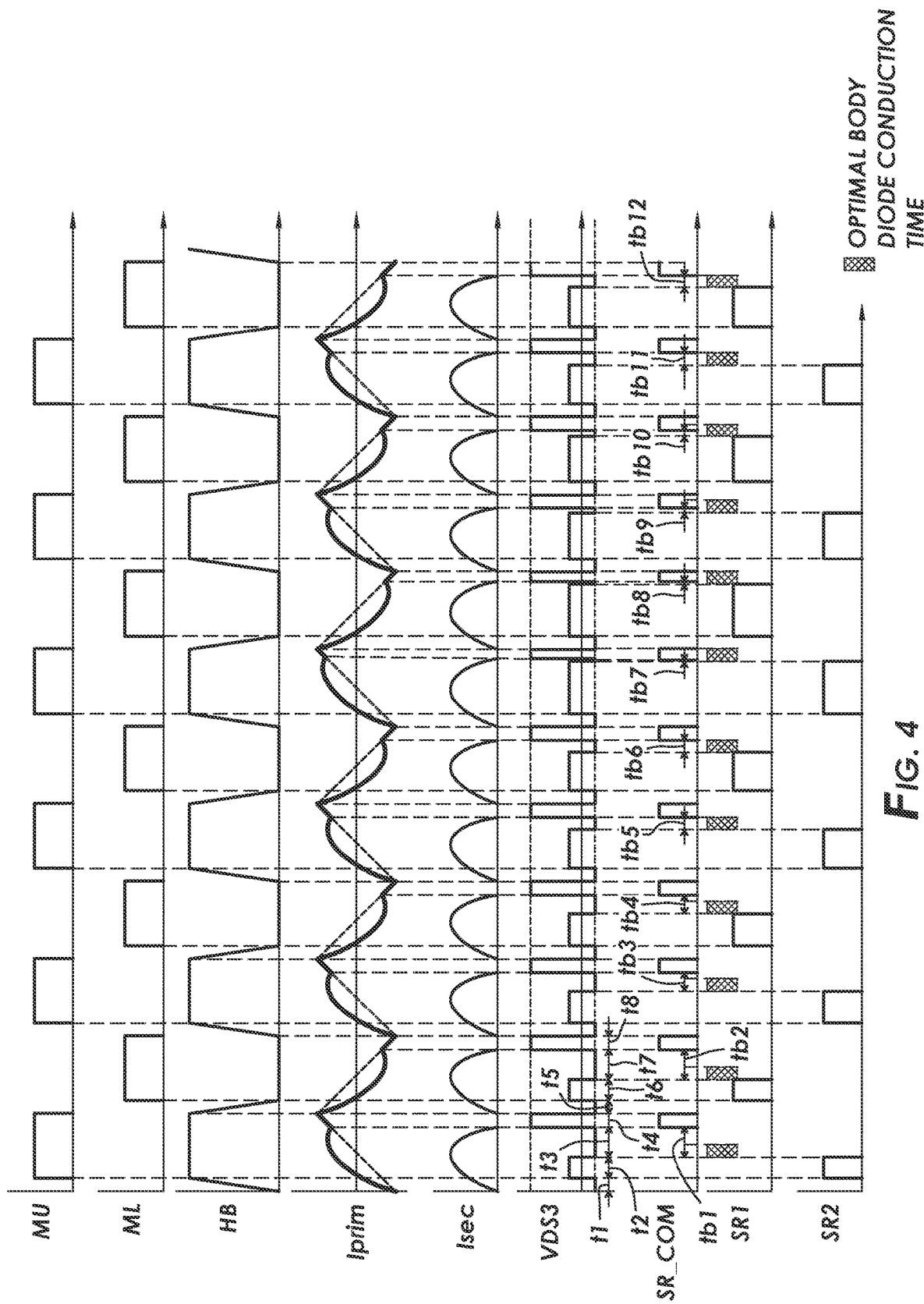
FIG. 4 is a timing diagram of example operation of a power converter operating below resonance in accordance with some implementations.

SR controller 308 outputs SR signal SR2 via control terminal 124. When power converter 102 operates below resonance, SR controller 308 pulses SR signal SR2 responsive to primary signal MU. For example, referring to FIG. 4, SR signal SR2 pulses at time t2 when primary signal MU pulses. After time t2, SR signal SR2 goes down but current is still flowing on the secondary side 216 of transformer 212 (as indicated by the Isec plot in FIG. 4). In other words, body diode 220 is conducting during time t3. However, the conduction time of body diode 220 during time t3 (i.e., time tb1) is longer than an optimal body diode conduction time. Thus, controller 104 adjusts SR signal SR2 based on the body diode conduction time of body diode 220. For example, in FIG. 4, SR controller 308 increases the pulse width of SR signal SR2 during its second pulse. However, the body diode conduction time of body diode 220 during time tb3 is still longer than the optimal body diode conduction time. Thus, SR controller 308 again increases the pulse width of SR signal SR2 during its third pulse. After the third pulse, the conduction time of body diode 220 during time tb5 now matches the optimal duration. Moving to the fourth pulse of SR signal SR2 in FIG. 4, the conduction time of body diode 220 during time tb7 is now shorter than the optimal body diode conduction time. Thus, SR controller 308 decreases the pulse width of SR signal SR2 during its fifth pulse. However, the conduction time of body diode 220 during time tb9 is still shorter than the optimal body diode conduction time. Thus, SR controller 308 again decreases the pulse width of SR signal SR2 during its sixth pulse. After the sixth pulse, the conduction time of body diode 220 during time tb11 again matches the optimal body diode conduction time. The number of pulses needed to reach the optimal body diode conduction times of FIG. 4 are merely an example, and the number of pulses used to reach the optimal body diode conduction time is dependent upon, for example, operating conditions and process variations.

Returning to FIG. 3, SR controller 308 outputs SR signal SR1 via control terminal 122. When power converter 102 operates below resonance, SR controller 308 pulses SR signal SR1 responsive to primary signal ML. For example, referring to FIG. 4, SR signal SR1 pulses at time t6 when primary signal ML pulses. In a manner similar to SR signal SR2, controller 104 adjusts SR signal SR1 based on the conduction time of body diode 218. For example, SR controller 308 increases the pulse width of SR signal SR1 when the conduction time of body diode 218 is less than an optimal body diode conduction time and decreases the pulse width of SR signal SR1 when the conduction time of body diode 218 is greater than the optimal body diode conduction time.

In some implementations, when the body diode conduction time is too short, SR controller 308 is configured to decrease the body diode conduction time of the respective SR transistor by a fixed amount during each subsequent cycle until the body diode exhibits an optimal body diode conduction time. In other implementations, when the body diode conduction time is too short, SR controller 308 is configured to decrease the body diode conduction time of the respective SR transistor by an adjustable amount during each subsequent cycle until the body diode exhibits an optimal body diode conduction time. For example, SR controller 308 may decrease the body diode conduction time of the SR transistor by a smaller fixed amount when the body diode conduction time is less than the optimal body diode conduction time up to a deviation threshold and by a larger fixed amount when the body diode conduction time is less than the optimal body diode conduction time by more than deviation threshold.

Controller 104 determines conduction times for body diodes 218 and 220 based on the combined drain voltage signal VDS3. For example, SR controller 308 illustrated in FIG. 3 may determine the conduction time of body diode 218 as the duration between SR transistor 222 being turned off and comparison signal SR_COM subsequently pulsing (response to the combined drain voltage signal VDS3 rising above the reference voltage Vref). As a further example, SR controller 308 illustrated in FIG. 3 may determine the conduction time of body diode 220 as the duration between SR transistor 224 being turned off and comparison signal SR_COM subsequently pulsing (again response to the combined drain voltage signal VDS3 rising above the reference voltage Vref).

Figure 5:
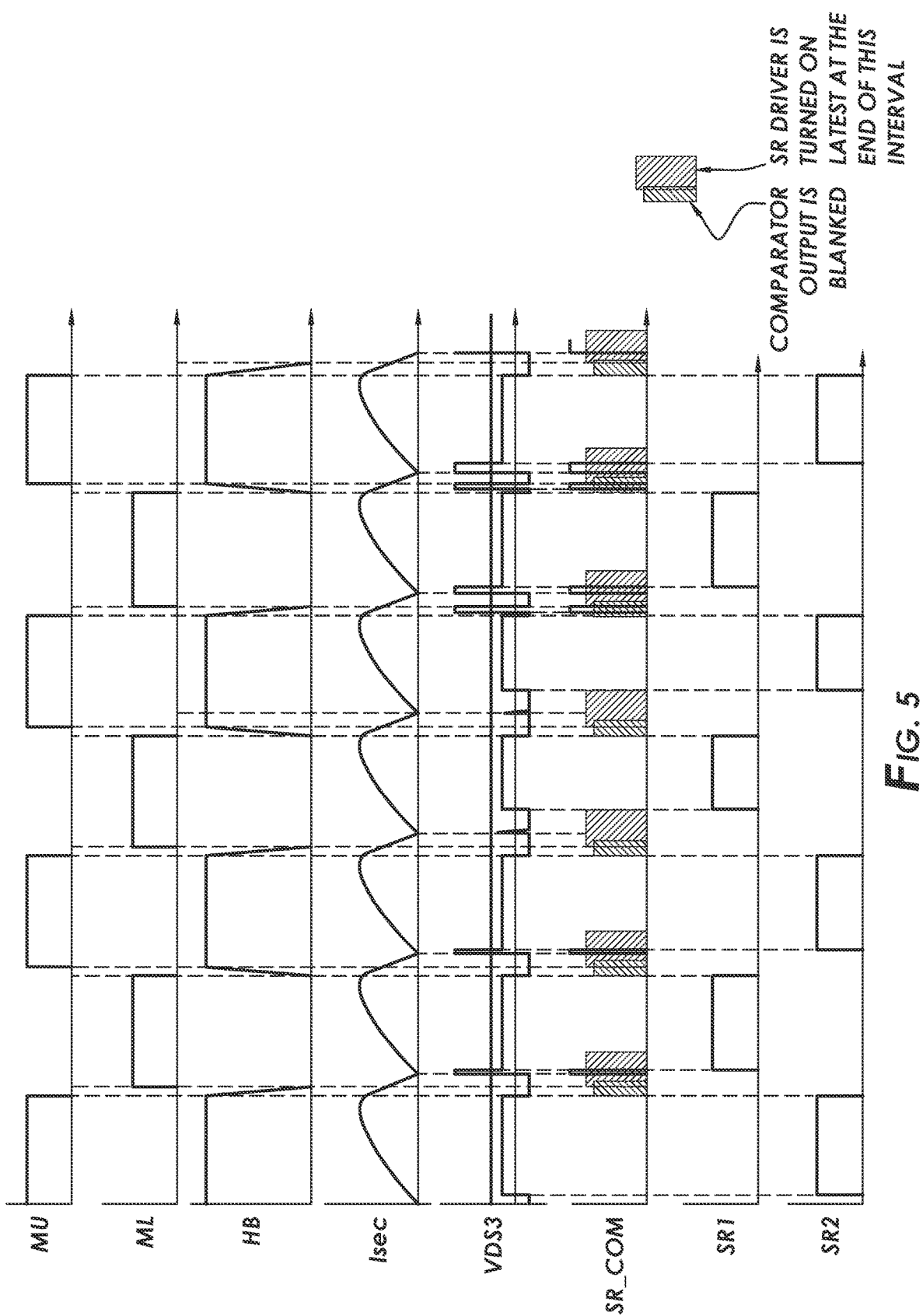
FIG. 5 is a timing diagram of example operation of a power converter operating above resonance with an SR turn-on delay in accordance with some implementations.

When power converter 102 operates above resonance, SR transistor 222 may not be able to turn on immediately when primary transistor 204 turns on because it takes some time to change secondary side direction. For example, as illustrated in FIG. 5, primary transistor 204 turns on (as indicated by primary signal ML going high) while current is still flowing through the secondary side 216 of transformer 212. As also illustrated in FIG. 5, comparison signal SR_COM pulses when no current is flowing through the secondary side 216 of transformer 212. Thus, in some implementations, SR controller 308 may turn SR transistor 222 on responsive to a falling edge of comparison signal SR_COM. Further, SR controller 308 may turn SR transistor 224 on responsive to a falling edge of comparison signal SR_COM. Comparison signal SR_COM may pulse while current is flowing through the secondary side 216 of transformer 212 due to, e.g., noise. For example, after the third pulse of SR signal SR2 in FIG. 5, comparison signal SR_COM pulses while current is still flowing the secondary side 216 of transformer 212. To avoid catching noise, in some implementations, controller 104 implements a blanking time after opposite SR turn-off. For example, referring to the third pulse of SR signal SR1 in FIG. 5, SR controller 308 ignores the fall edge of comparison signal SR_COM that occurs during the blanking time and then turns SR transistor 222 on responsive to the subsequent falling edge of comparison signal SR_COM that occurs after the blanking time. In some situations, comparison signal SR_COM may not pulse when no current is flowing through the secondary side 216 of transformer 212. For example, the interval at which no current is flowing through the secondary side 216 of transformer 212 may be so short such that it is not detected by comparator 306. Thus, in some implementations, when no falling edge of comparison signal SR_COM is detected, controller 104 may turn SR transistor 222 on after a predetermined period of time following primary transistor 204 being turned on. For example, referring to the second pulse of SR signal SR1 in FIG. 5, SR controller 308 turns SR transistor 222 on because no falling edge of comparison signal SR_COM is detected during a predetermined period of time after primary transistor 204 is turned on. Further, when no falling edge of comparison signal SR_COM is detected, controller 104 may turn transistor 224 on after a predetermined period of time following primary transistor 202 being turned on.

Figure 6:
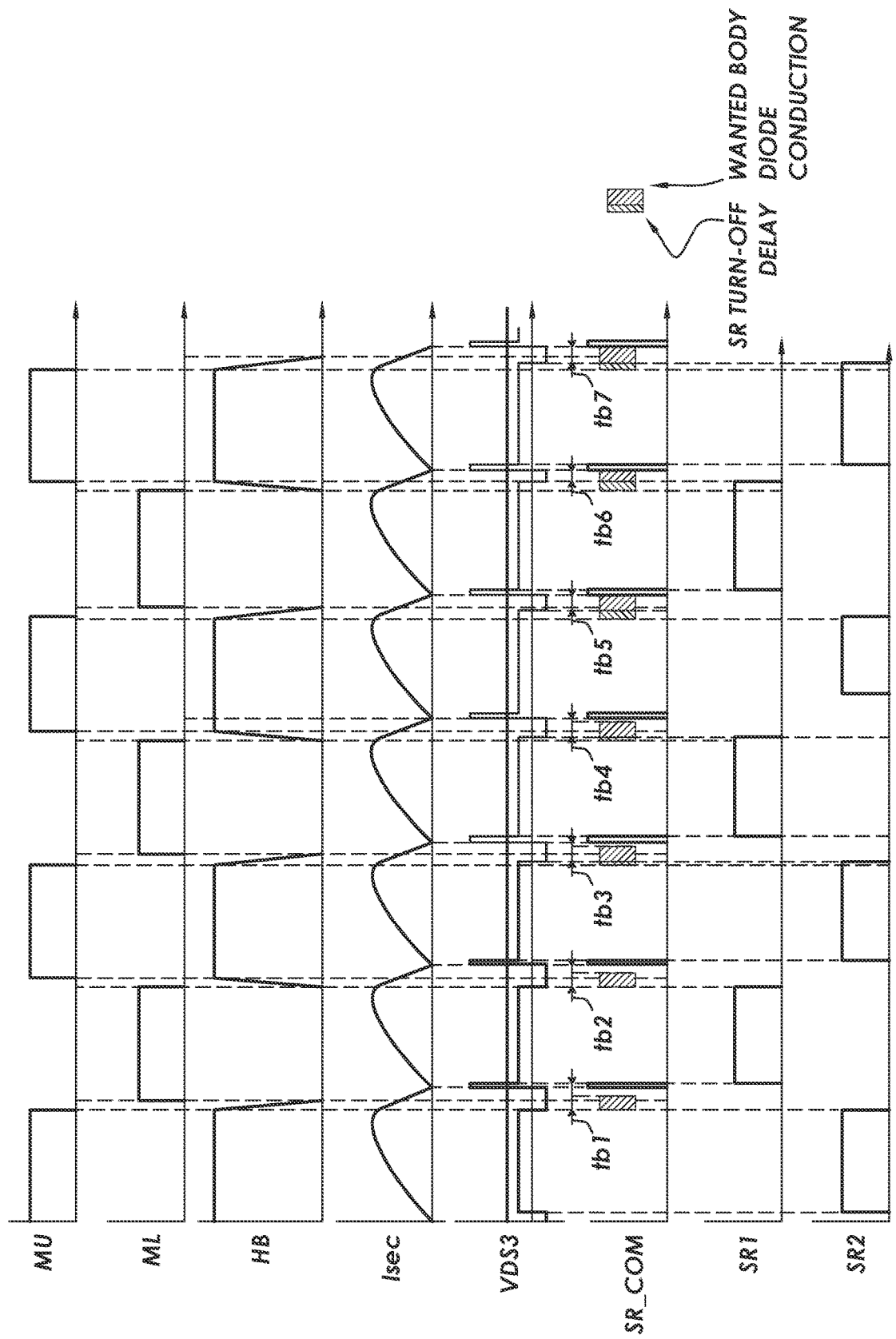
FIG. 6 is a timing diagram of example operation of a power converter operating above resonance with an SR turn-off delay in accordance with some implementations.

In some implementations, when power converter 102 operates above resonance, controller 104 turns SR transistor 222 off when primary signal ML indicates that primary transistor 204 is turned off, and turns SR transistor 224 off when primary signal MU indicates that primary transistor 202 is turned off. However, when SR transistors 222 and 224 are turned off by primary signals ML and MU, respectively, the conduction times of body diodes 218 and 220 may be longer than an optimal body diode conduction time. Thus, in some implementations, controller 104 adds a turn-off delay. For example, referring to the second pulse of SR signal SR2 in FIG. 6, SR controller 308 turns SR transistor 224 off after a period of time following primary signal MU indicating that primary transistor 202 is turned off. However, the conduction time of body diode 220 during time tb3 is longer than an optimal body diode conduction time. Thus, during the next pulse of SR signal SR2, controller 104 increases the turn off delay by increasing the pulse width of SR signal SR2. After the third pulse of SR signal SR2 in FIG. 6, the conduction time of body diode 220 during time tb5 now matches the optimal body diode conduction time. As described above, controller 104 may determine conduction times of body diodes 218 and 220 based on transitions of comparison signal SR_COM. However, as also described above, in some situations, SR controller 308 may not detect every transition of comparison signal SR_COM. Thus, in some implementations, controller 104 may reset the turn-off delay when no transition of comparison signal SR_COM is found before the opposite SR transistor is turned on. Alternatively, or in addition, controller 104 may only increase the turn-off delay up to a predetermined maximum length.

Figure 7:
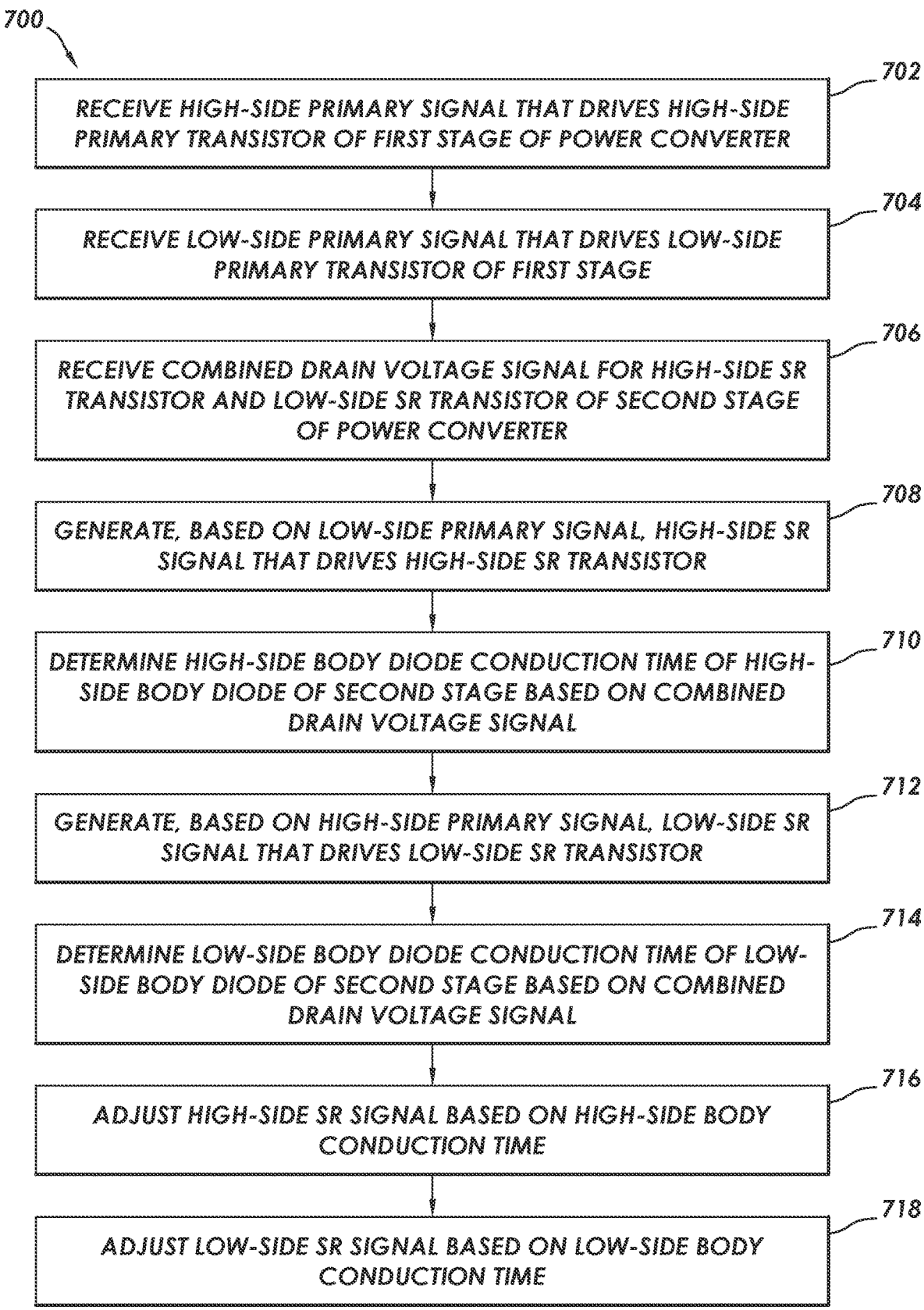
FIG. 7 is a flow diagram of an example of a method for operating a power converter in accordance with some implementations.

FIG. 7 is a flow diagram of an example of a method for operating a power converter in accordance with some implementations. At block 702, a high-side primary signal is received. The high-side primary signal drives a high-side primary transistor of a first stage of a power converter. For example, controller 104 (or more particularly, SR controller 308) may receive the primary signal MU that drives primary transistor 202 of the primary side 214 of transformer 212 in power converter 102. At block 704, a low-side primary signal is received. The low-side primary signal drives a low-side primary transistor of the first stage. For example, controller 104 (or more particularly, SR controller 308) may receive the primary signal ML that drives primary transistor 204 of the primary side 214 of transformer 212 in power converter 102. At block 706, a combined drain voltage signal is received. The combined drain voltage signal is for a high-side SR transistor and a low-side SR transistor of a second stage of the power converter. For example, controller 104 (or more particularly, comparator 306) may receive the combined drain voltage signal VDS3 for SR transistors 222 and 224 of the secondary side 216 of transformer 212 in power converter 102.

At block 708, a high-side SR signal is generated based on the low-side primary signal. The high-side SR signal drives the high-side SR transistor. For example, the controller 104 (or more particularly, SR controller 308) may generate, based on the primary signal ML, SR signal S2 that drives SR transistor 222 in accordance with the methods described above in relation to FIGS. 4, 5, and 6. At block 710, a high-side body diode conduction time of a high-side body diode of the second stage is determined based on the combined drain voltage signal. For example, controller 104 (or more particularly, SR controller 308) may determine, based on the combined drain voltage signal VDS3, a conduction time of body diode 218 of the secondary side 216 of transformer 212 in power converter 102 in accordance with the methods described above in relation to FIG. 4. At block 712, a low-side SR signal is generated based on the high-side primary signal. The low-side SR signal drives the low-side SR transistor. For example, the controller 104 (or more particularly, SR controller 308) may generate, based on the primary signal MU, SR signal 51 that drives SR transistor 224 in accordance with the methods described above in relation to FIGS. 4, 5, and 6. At block 714, a low-side body diode conduction time of a low-side body diode of the second stage is determined based on the combined drain voltage signal. For example, controller 104 (or more particularly, SR controller 308) may determine, based on the combined drain voltage signal VDS3, a conduction time of body diode 220 of the secondary side 216 of transformer 212 in power converter 102 in accordance with the methods described above in relation to FIG. 4.

At block 716, the high-side SR signal is adjusted based on the high-side body diode conduction time. For example, controller 104 (or more particularly, SR controller 308) may adjust the pulse width of SR signal SR1 based on the body diode conduction time of body diode 218. At block 718, the low-side SR signal is adjusted based on the low-side body diode conduction time. For example, controller 104 (or more particularly, SR controller 308) may adjust the pulse width of SR signal SR2 based on the body diode conduction time of body diode 220.

Figure 8:
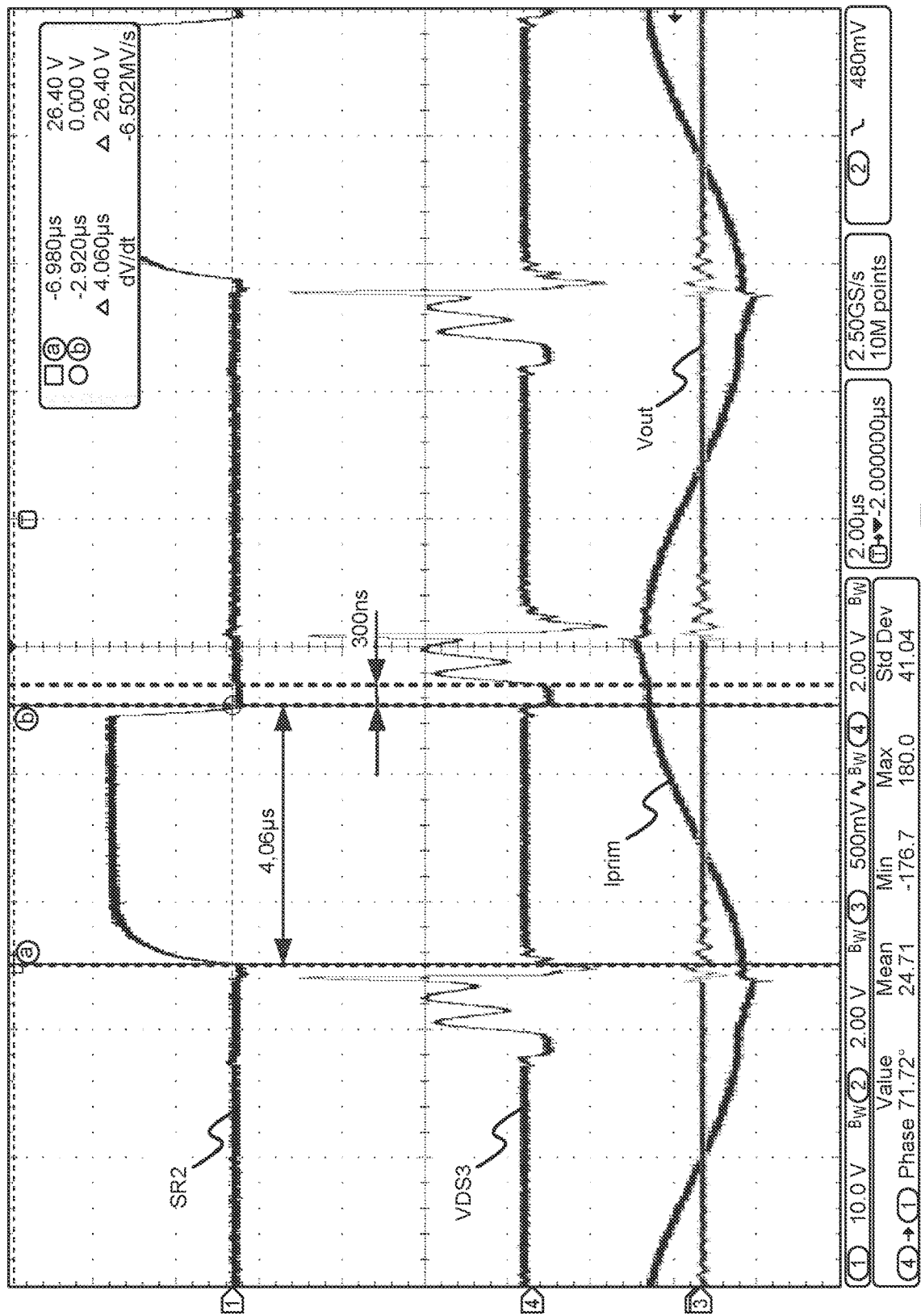
FIG. 8 is a plot of an example of a response of a power converter operating in a steady-state below resonance for a light load in accordance with some implementations.
Figure 9:
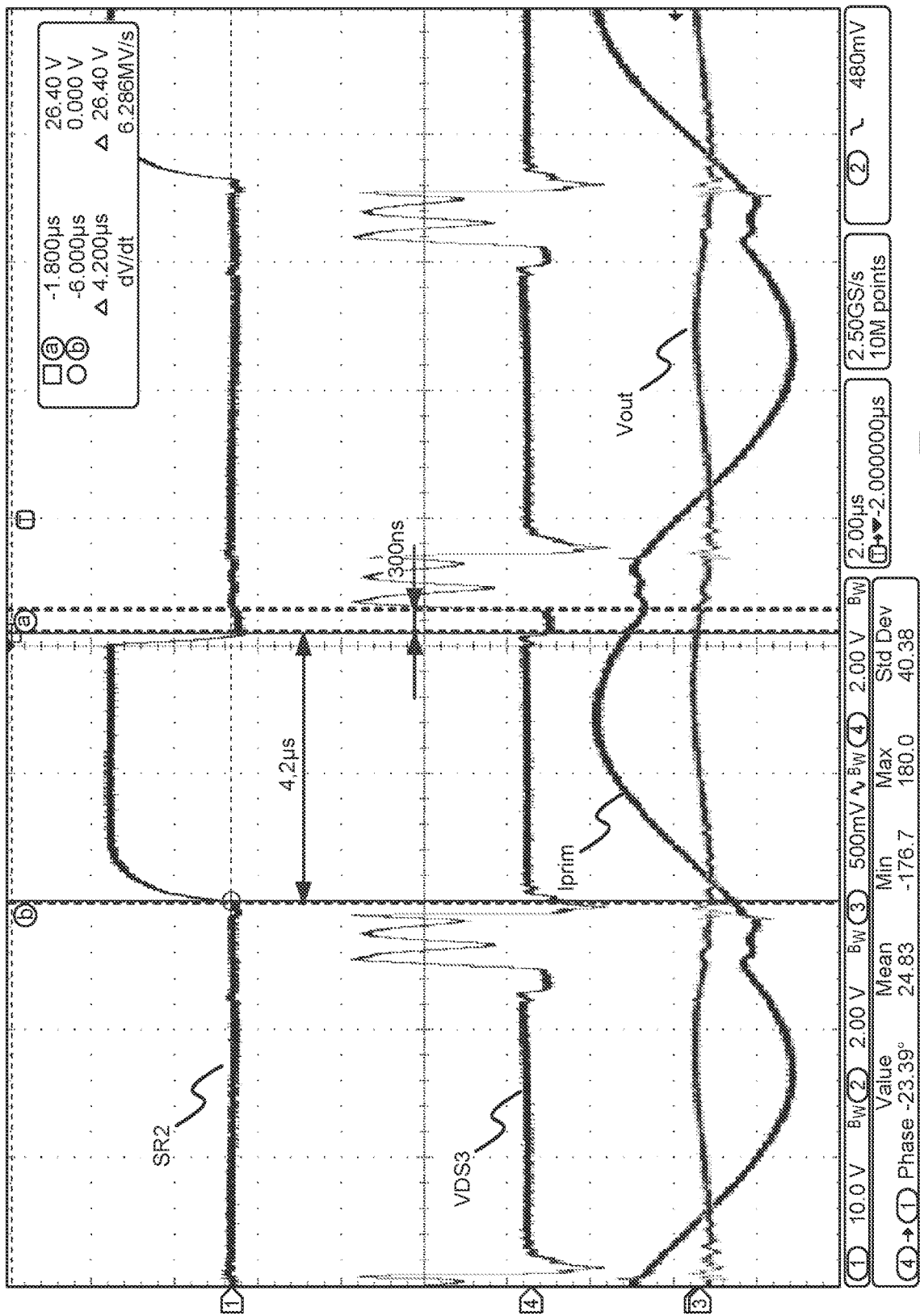
FIG. 9 is a plot of an example of a response of a power converter operating in a steady-state below resonance for a full load in accordance with some implementations.
Figure 10:
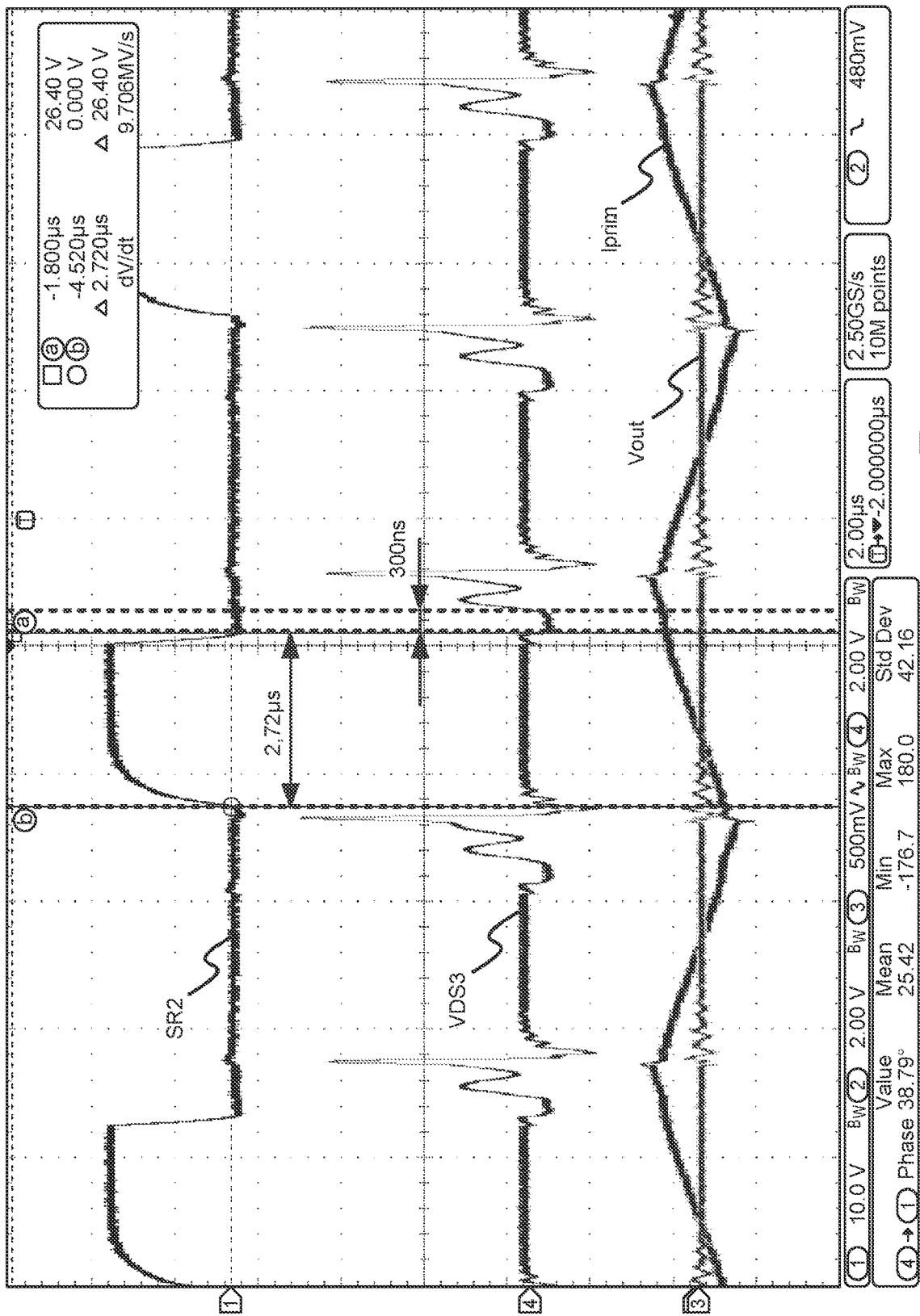
FIG. 10 is a plot of an example of a response of a power converter operating in a steady-state above resonance for a light load in accordance with some implementations.
Figure 11:
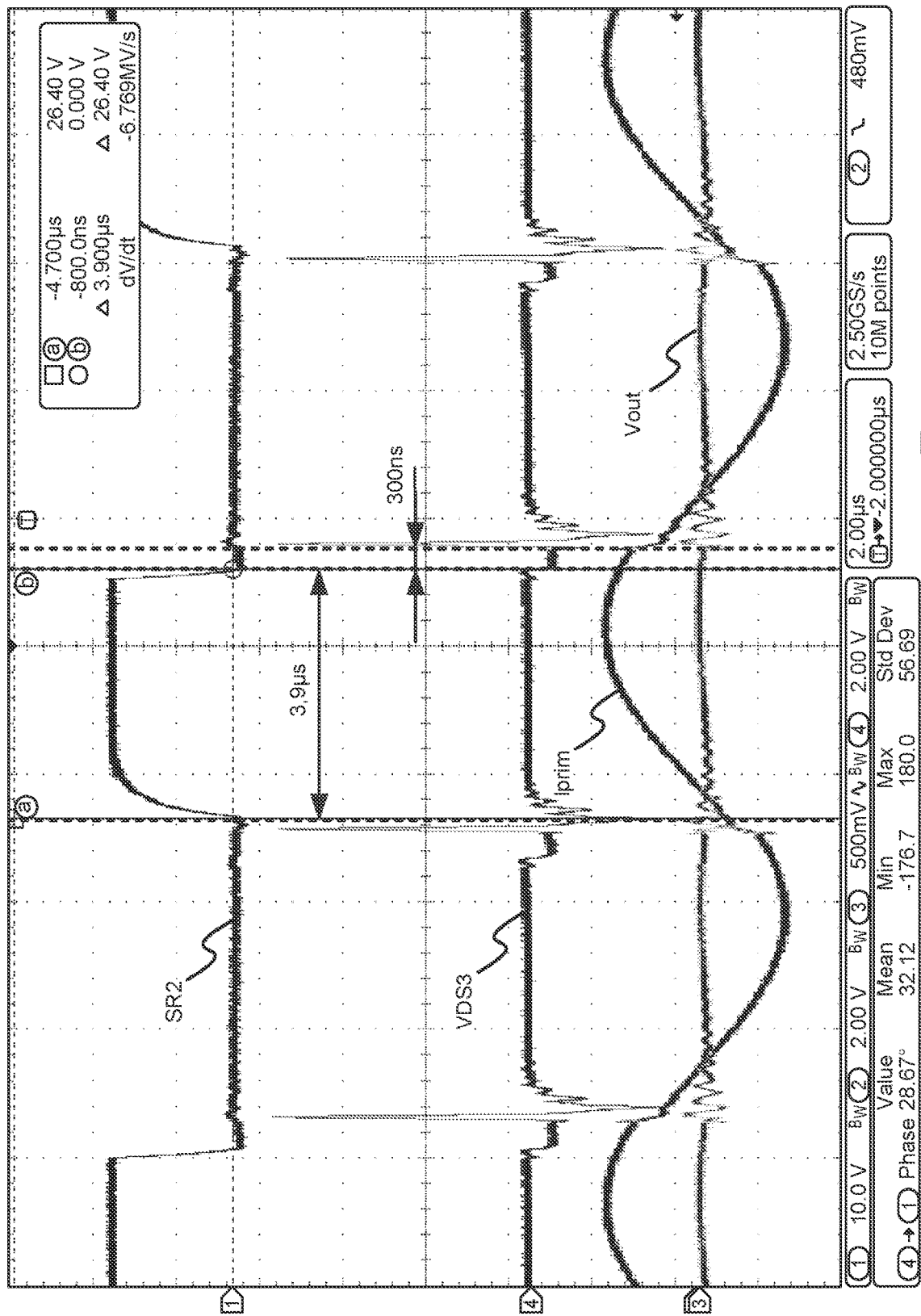
FIG. 11 is a plot of an example of a response of a power converter operating in a steady-state above resonance for a full load in accordance with some implementations.

FIG. 8 is a plot of an example of a response of the power converter 102 operating in a steady state below resonance for a light load of 10 Amps. FIG. 9 is a plot of an example of a response of the power converter 102 operating in a steady state below resonance for a full load of 100 Amps. FIG. 10 is a plot of an example of a response of the power converter 102 operating in a steady state above resonance for a light load of 10 Amps. FIG. 11 is a plot of an example of a response of a power converter operating in a steady state above resonance for a full load of 100 Amps. As illustrated by the plots of Vout in FIGS. 8, 9, 10, and 11, the output is stable for both low and high loads as well as for below resonance and above resonance operations. Further, the plots of Vout in FIGS. 8, 9, 10, and 11 illustrate that body diode conduction time is stable and thus the output is also stable.

Figure 12:
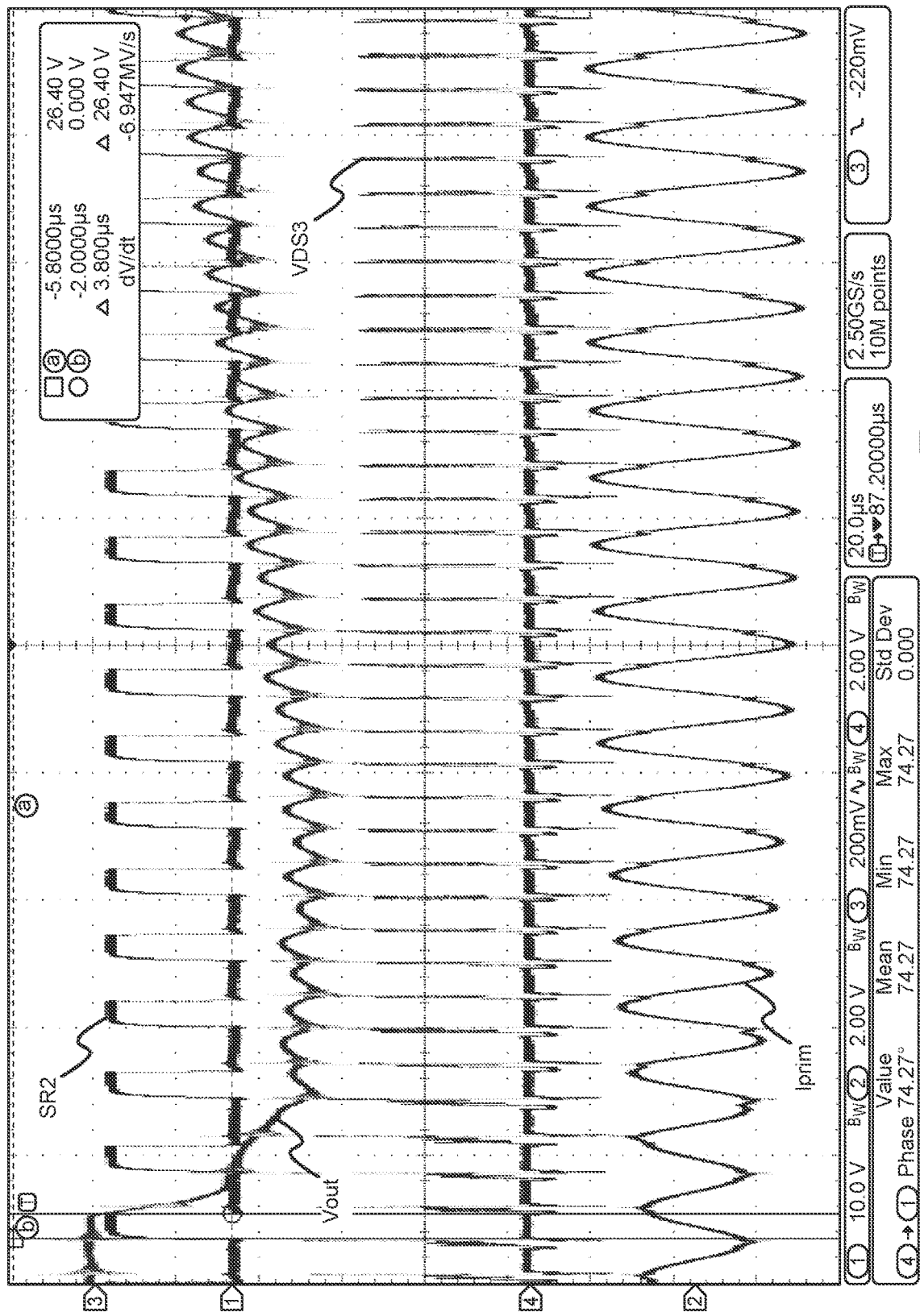
FIG. 12 is a plot of an example of a transient response of a power converter operating below resonance for a step load in accordance with some implementations.
Figure 13:
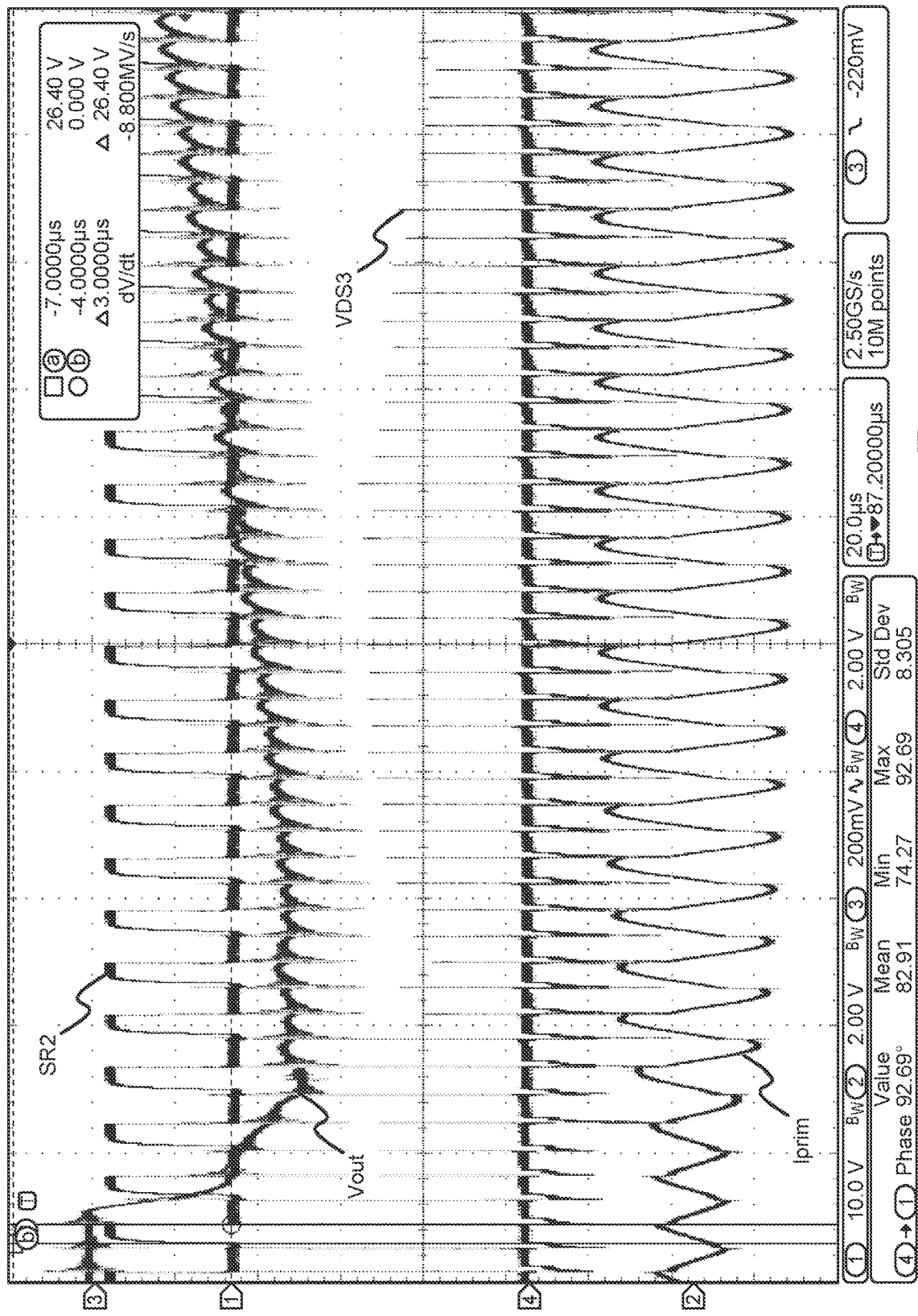
FIG. 13 is a plot of an example of a transient response of a power converter operating above resonance for a step load in accordance with some implementations.

FIG. 12 is a plot of an example of a transient response of the power converter 102 operating below resonance for a step load from 10 Amps to 100 Amps. FIG. 13 is a plot of an example of a transient response of the power converter 102 operating above resonance for a step load from 10 Amps to 100 Amps. As illustrated by the plots of the combined drain voltage signal VDS3 in FIGS. 12 and 13, there is no cross-conduction or negative currents despite the changing load conditions.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. A method for operating a power converter, the method comprising:
    receiving a high-side primary signal that drives a high-side primary transistor of a first stage of the power converter;
    receiving a low-side primary signal that drives a low-side primary transistor of the first stage;
    generating a combined drain voltage signal by adding:
        a drain voltage signal of a high-side synchronous rectifier (SR) transistor of a second stage of the power converter, and
        a drain voltage signal of a low-side SR transistor of the second stage of the power converter;
    generating, based on the low-side primary signal, a high-side SR signal that drives the high-side SR transistor;
    determining a high-side body diode conduction time of a high-side body diode of the second stage based on the combined drain voltage signal;
    generating, based on the high-side primary signal, a low-side SR signal that drives the low-side SR transistor;
    determining a low-side body diode conduction time of a low-side body diode of the second stage based on the combined drain voltage signal;
    adjusting the high-side SR signal based on the high-side body diode conduction time; and
    adjusting the low-side SR signal based on the low-side body diode conduction time.

2. The method of claim 1, wherein adjusting the high-side SR signal based on the high-side body diode conduction time further includes:
    adjusting the high-side SR signal to increase a conduction cycle of the high-side SR transistor when the high-side body diode conduction time is greater than a predetermined conduction time, and
    adjusting the high-side SR signal to decrease the conduction cycle of the high-side SR transistor when the high-side body diode conduction time is less than the predetermined conduction time.

3. The method of claim 2, wherein generating the high-side SR signal further includes:
    generating the high-side SR signal to turn on the high-side SR transistor when the low-side primary signal indicates that the low-side primary transistor is turned on, and generating the high-side SR signal to turn off the high-side SR transistor at an end of the conduction cycle.

4. The method of claim 1, wherein determining the high-side body diode conduction time based on the combined drain voltage signal further comprising:
generating a comparison signal by comparing the combined drain voltage signal to a reference voltage, and
determining the high-side body diode conduction time as a duration between the high-side SR transistor being turned off and a transition of the comparison signal.

5. The method of claim 1, wherein generating the high-side SR signal further includes:
generating a comparison signal by comparing the combined drain voltage signal to a reference voltage, and
generating the high-side SR signal to turn on the high-side SR transistor responsive to a transition of the comparison signal after the low-side SR transistor is turned off.

6. The method of claim 5, further including ignoring the comparison signal during a predetermined period of time following the low-side SR transistor being turned off.

7. The method of claim 5, wherein generating the high-side SR signal further includes generating the high-side SR signal to turn on the high-side SR transistor after a predetermined period of time following the low-side primary signal indicating that the low-side primary transistor is turned on.

8. The method of claim 1, wherein generating the high-side SR signal further includes generating the high-side SR signal to turn off the high-side SR transistor after a period of time following the low-side primary signal indicating that the low-side primary transistor is turned off, and
wherein adjusting the high-side SR signal based on the high-side body diode conduction time further includes increasing the period of time when the high-side body diode conduction time is greater than a predetermined conduction time.

9. A system for power conversion, comprising:
a power converter including:
a first stage having:
a high-side primary transistor driven by a high-side primary signal, and
a low-side primary transistor driven by a low-side primary signal, and
a second stage having a high-side synchronous rectifier (SR) transistor, a high-side body diode, a low-side SR transistor, and a low-side body diode; and
a controller configured to:
generate a combined drain voltage signal by adding a drain voltage signal of the high-side SR transistor and a drain voltage signal of the low-side SR transistor,
generate, based on the low-side primary signal, a high-side SR signal that drives the high-side SR transistor,
determine a high-side body diode conduction time of the high-side body diode based on the combined drain voltage signal for the high-side SR transistor and the low-side SR transistor,
generate, based on the high-side primary signal, a low-side SR signal that drives the low-side SR transistor,
determine a low-side body diode conduction time of the low-side body diode based on the combined drain voltage signal,
adjust the high-side SR signal based on the high-side body diode conduction time, and
adjust the low-side SR signal based on the low-side body diode conduction time.

10. The system of claim 9, wherein, to adjust the high-side SR signal based on the high-side body diode conduction time, the controller is further configured to:
adjust the high-side SR signal to increase a conduction cycle of the high-side SR transistor when the high-side body diode conduction time is greater than a predetermined conduction time, and
adjust the high-side SR signal to decrease the conduction cycle of the high-side SR transistor when the high-side body diode conduction time is less than the predetermined conduction time.

11. The system of claim 10, wherein, to generate the high-side SR signal, the controller is further configured to:
generate the high-side SR signal to turn on the high-side SR transistor when the low-side primary signal indicates that the low-side primary transistor is turned on, and
generate the high-side SR signal to turn off the high-side SR transistor at an end of the conduction cycle.

12. The system of claim 9, wherein the controller further includes a comparator configured to generate a comparison signal by comparing the combined drain voltage signal to a reference voltage, and
wherein, to determine the high-side body diode conduction time based on the combined drain voltage signal, the controller is further configured to determine the high-side body diode conduction time as a duration between the high-side SR transistor being turned off and a transition of the comparison signal.

13. The system of claim 9, wherein the controller further includes a comparator configured to generate a comparison signal by comparing the combined drain voltage signal to a reference voltage, and
wherein, to generate the high-side SR signal, the controller is further configured to generate the high-side SR signal to turn on the high-side SR transistor responsive to a transition of the comparison signal after the low-side SR transistor is turned off.

14. The system of claim 13, wherein the controller is further configured to ignore the comparison signal during a predetermined period of time following the low-side SR transistor being turned off.

15. The system of claim 13, wherein, to generate the high-side SR signal, the controller is further configured to generate the high-side SR signal to turn on the high-side SR transistor after a predetermined period of time following the low-side primary signal indicating that the low-side primary transistor is turned on.

16. The system of claim 9, wherein, to generate the high-side SR signal, the controller is further configured to generate the high-side SR signal to turn off the high-side SR transistor after a period of time following the low-side primary signal being turned off, and
wherein, to adjust the high-side SR signal based on the high-side body diode conduction time, the controller is further configured to increase the period of time when the high-side body diode conduction time is greater than a predetermined conduction time.

17. The system of claim 9, wherein the controller further includes:
a comparator configured to generate a comparison signal by comparing the combined drain voltage signal to a reference voltage, and
a pair of diodes configured to generate the combined drain voltage signal by adding the drain voltage signal of the high-side SR transistor and the drain voltage signal of the low-side SR transistor, wherein an anode of each of the pair of diodes is coupled to a non-inverting input of the comparator, wherein, to determine the high-side body diode conduction time based on the combined drain voltage signal, the controller is further configured to determine the high-side body diode conduction time based on the comparison signal.

18. A controller for a power converter, comprising:

a first reference terminal configured to receive a high-side primary signal that drives a high-side primary transistor of a first stage of the power converter;

a second reference terminal configured to receive a low-side primary signal that drives a low-side primary transistor of the first stage;

a node for generating a combined drain voltage signal by adding:
- a drain voltage signal of a high-side synchronous rectifier (SR) transistor of a second stage of the power converter, and
- a drain voltage signal of a low-side SR transistor of the second stage of the power converter; and an SR controller configured to:
- generate, based on the low-side primary signal, a high-side SR signal that drives the high-side SR transistor,
- determine a high-side body diode conduction time of a high-side body diode of the second stage based on the combined drain voltage signal,
- generate, based on the high-side primary signal, a low-side SR signal that drives the low-side SR transistor,
- determine a low-side body diode conduction time of a low-side body diode of the second stage based on the combined drain voltage signal,
- adjust the high-side SR signal based on the high-side body diode conduction time, and
- adjust the low-side SR signal based on the low-side body diode conduction time.

19. The controller of claim 18, wherein, to adjust the high-side SR signal based on the high-side body diode conduction time, the controller is further configured to:

adjust the high-side SR signal to increase a conduction cycle of the high-side SR transistor when the high-side body diode conduction time is greater than a predetermined conduction time, and adjust the high-side SR signal to decrease the conduction cycle of the high-side SR transistor when the high-side body diode conduction time is less than the predetermined conduction time.

20. The controller of claim 18, wherein, to determine the high-side conduction body diode time based on the combined drain voltage signal, the controller is further configured to:

generate a comparison signal by comparing the combined drain voltage signal to a reference voltage, and determine the high-side body diode conduction time as a duration between the high-side SR transistor being turned off and a transition of the comparison signal.

* * * * *